(12) United States Patent
Beresniewicz et al.

(10) Patent No.: US 7,246,043 B2
(45) Date of Patent: Jul. 17, 2007

(54) GRAPHICAL DISPLAY AND CORRELATION OF SEVERITY SCORES OF SYSTEM METRICS

(75) Inventors: John M. Beresniewicz, San Mateo, CA (US); Amir Najmi, San Francisco, CA (US); Jonathan F. Soule, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 22 days.

(21) Appl. No.: 11/173,524

(22) Filed: Jun. 30, 2005

(65) Prior Publication Data
US 2007/0005296 A1 Jan. 4, 2007

(51) Int. Cl.
*G06F 15/00* (2006.01)
(52) U.S. Cl. .......................... 702/194; 714/25
(58) Field of Classification Search ............... 702/189, 702/182–185, 194; 712/200; 714/25
See application file for complete search history.

(56) References Cited

U.S. PATENT DOCUMENTS 5,961,332 A * 10/1999 Joao ........................ 434/236

OTHER PUBLICATIONS

David Comer & Mike Fodor (Product Managers), "Capabilities and Value of AppManager® Peformance Profiler", NetConnect 2005, netiQ, pp. 1-15.

Don Burleson, "Oracle 10g Predictive Modeling", Burleson Consulting, (Prior to Jun. 30, 2005), pp. 1-6.
Randall C. Kennedy, "APM gets smart with ProactiveNet's latest", InfoWorld, Oct. 1, 2004, pp. 1-3.
Entire Prosecution History of U.S. Appl. No. 11/173,525, filed by Beresniewicz on Jun. 30, 2005, including any Office Actions and Amendments therein.

* cited by examiner

*Primary Examiner*—Edward Raymond
(74) *Attorney, Agent, or Firm*—Silicon Valley Patent Group LLP; Omkar Suryadevara (57) ABSTRACT

A computer derives, from a current measurement of an attribute of a system, an instantaneous severity score based on a probability model that is determined from prior measurements. The computer then displays, for several successive moments in time, either the instantaneous severity score or an aggregated severity score obtained from a set of instantaneous severity scores (e.g. by averaging). Each set of scores to be aggregated may be identified by, e.g., a fixed-width time window located at a fixed offset from a moment in time at which the aggregated score is to be displayed. Aggregation suppresses or dampens momentary abnormalities, which would otherwise get displayed. In some embodiments, graphs for multiple categories of metrics are displayed on a single screen, aligned in time, to enable a human operator to form a visual correlation therebetween, e.g. to identify causes of atypical performance in the system.

13 Claims, 8 Drawing Sheets

GRAPHICAL DISPLAY AND CORRELATION OF SEVERITY SCORES OF SYSTEM METRICS

BACKGROUND

Figure 1A:
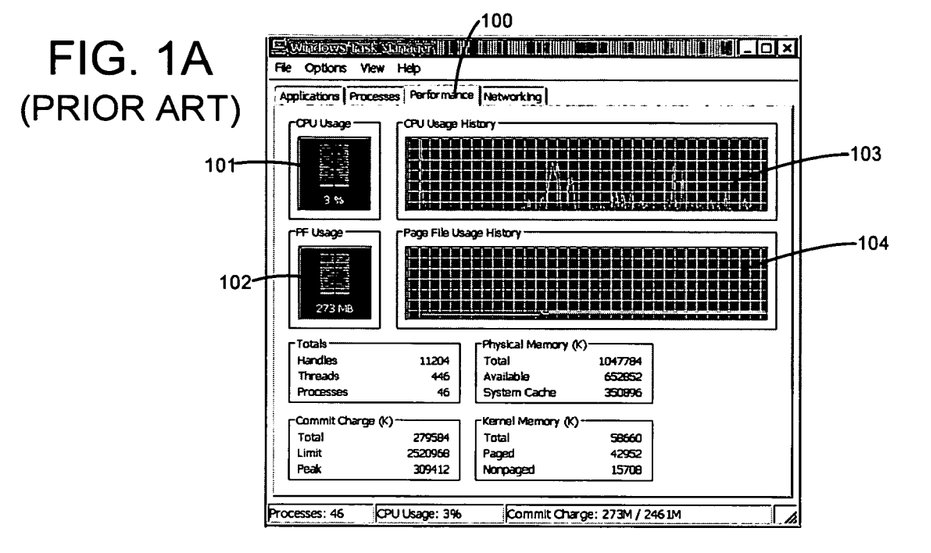
FIGS. 1A, 1B and 1C illustrate graphical displays of prior tools.

A tool called Task Manager in the Windows XP operating system available from Microsoft Corporation, has a tab 100 for performance metrics, wherein four graphical displays of system performance are shown as illustrated in FIG. 1A. Two graphical displays 101 and 102 are for a current point in time, and respectively show the current CPU Usage, and PF Usage. Two additional graphical displays 103 and 104 in tab 100 show the CPU Usage History, and Page File Usage History. Display 101 for CPU Usage shows the amount of current processor usage, expressed as a percentage of total capacity. Display 103 for CPU Usage History shows the percentage of CPU capacity used over time. Display 102 for PF Usage shows the amount of virtual memory that has been "committed" or used. Display 104 for Page File Usage History shows usage of virtual memory over time.

Displays 103 and 104 appear to be showing actual metric values on the Y-axis, as measured. When fixed thresholds are used to generate alerts, they can be projected onto the time series graphs in displays 103 and 104 as horizontal lines intersecting Y-axis at threshold values, perhaps with some color distinguishing the type of threshold (e.g. WARNING=yellow and RED=critical). Note that the two graphical displays 103 and 104 in FIG. 1A are displayed in a common single screen 100, and note further that their respective X-axes move in synchronization with one another. Such synchronous movement of X-axes permits a human operator to visually identify a correlation, if present, between peaks and/or valleys in the two metrics in graphical displays 103 and 104.

The inventors note the following shortcomings with the display of the actual time series of raw data, of the type shown in FIG. 1A. Although graphical display 103 has a fixed range of 0-100%, graphical displays 103 and 104 in FIG. 1A have Y-axis dimensions that are specific to the metric displayed in each chart. For example the units for chart 103 are percentages while the units in chart 104 are MB of memory. This precludes making useful conclusions from similar chart features that may happen to occur across the two metrics series.

Figure 1B:
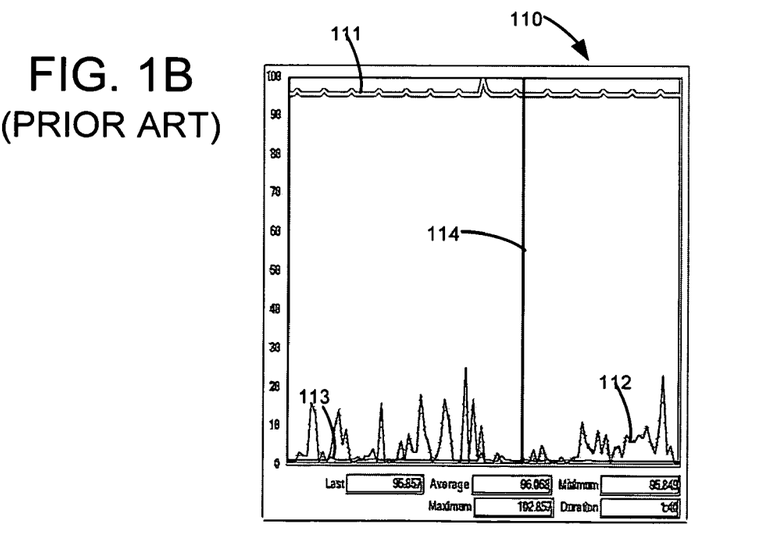

FIG. 1B illustrates a graphical display 110 presented by a feature called "Performance Monitor" included in a tool called "Microsoft Management Console" in the Windows XP operating system. In display 110, three lines 111, 112 and 113 (in three different colors) respectively show the following metrics (1) pages/sec, (2) % processor Time, and (3) Avg. Disk Queue Length. The three metrics in FIG. 1B are all shown with a common Y axis which has the range 0-100. A line 114 separates the more recent measurements (on the left side) from the earlier measurements (on the right side), and line 114 moves to the right as the graphs are re-drawn.

The inventors note that the display of FIG. 1B (as well as FIG. 1A) has a problem, namely that such a display becomes easily dominated by one or more measurements (called "outliers") of a metric, if their values (on the Y axis) are significantly larger than the rest of the measurements of the metric. While such outliers may be of some interest, the visual impact of their display becomes disproportionate, especially if the metric (e.g. page file usage or average disk queue length) has an unknown maximum.

Figure 1C:
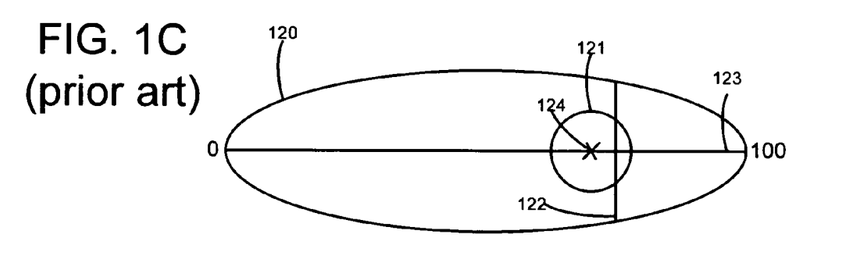

FIG. 1C illustrates a prior art display, in an ellipse 120, of a metric that is naturally represented as a percentage (such as buffer cache hit ratio), with the range of values 0-100 shown along horizontal axis 123, and a current value for the metric shown as a vertical line 122. Note that also displayed in FIG. 1C is an "X" that is labeled 124 which represents a mean of prior measurements, and a circle 121 centered at the mean 124 with a radius of one standard deviation distance.

SUMMARY

A computer is programmed, in accordance with the invention, to calculate, for a current measurement, of an attribute of a system (hereinafter metric), a score (hereinafter "instantaneous severity score") based directly or indirectly on a probability model that has been determined from prior measurements. The score which results from such calculation, because it is based on probability, indicates likeliness or unlikeliness of occurrence of the current measurement, relative to prior measurements.

In several embodiments, the computer is programmed to receive a time series of measurements (hereinafter "input time series") of a given metric. Depending on the embodiment, the computer may be programmed to display either the instantaneous severity score at each moment in time (i.e. the instantaneous value), or an aggregate value. The aggregate value may be generated by application of any formula (such as an averaging formula) to a set of instantaneous severity scores (e.g. such a set may be defined by a window of time). Time averaging embodiments filter out or damp down momentary abnormalities in the measurements, which would otherwise get displayed. In some time averaging embodiments, the instantaneous value is displayed instead of the time averaged value during a period when a metric is detected as having just returned to normalcy, so as to accurately portray the moment at which normalcy returned.

In some embodiments, the instantaneous or aggregated severity score, which results from such calculation, is set to zero, if a current measurement is likely to be normal (e.g. zero score if current measurement is ranked below $99^{th}$ percentile in the prior measurements), to avoid drawing a human administrator's attention to such measurements. A non-zero instantaneous severity score, when displayed, automatically emphasizes the occurrence of (i.e. the presence of) measurements that are probabilistically determined to be abnormal (e.g. ranked equal to or above the $99^{th}$ percentile) and hence worthy of human attention.

In some embodiments, graphs for multiple categories of metrics are displayed on a single screen at locations that are predetermined to be aligned to one another, to enable a human operator to form a visual correlation therebetween, e.g. to identify one or more causes of atypical performance in the computer system as being atypical workload volume and/or atypical workload type.

DETAILED DESCRIPTION

A computer 500 (illustrated in FIG. 5A) is programmed, in accordance with the invention, to automatically determine a probability model as illustrated by act 201 (FIG. 2A), from a number of measurements of a metric (hereinafter "prior measurements"), obtained at a corresponding number of moments in time in the past. Any probability model may be used in accordance with the invention to map measurements of the metric to corresponding numbers that represent scores of severity of the measurements relative to a user-selected "baseline" of prior measurements. One embodiment is based on percentile ranks that are extended to real numbers (e.g. 99.9% representing 1 in 1000 likelihood), for use in mapping of measurements of the metric to their corresponding severity scores.

A mapping is formed, in accordance with the invention, between (a) values of a metric (as observed) and (b) percentile ranks (or other probability indicators) with which severity scores are associated, by performing a probabilistic analysis of a set of prior measurements that represent normal behavior of the computer 500 system being monitored. For example, in a mapping implemented as illustrated in table 210 (FIG. 2C), values in a column 212 are identified from such a set of prior measurements, e.g. by sorting the prior measurements in ascending order and identifying their respective percentile ranks, if there are a sufficiently large number of prior measurements. The set of prior measurements is obtained by partitioning a time series of measurements of the metric, based on periodicity that is naturally inherent in the time series, e.g. by use of a time partitioning scheme selected by an administrator based on human workers' rhythm of working and resting, such as by morning/night and by weekday/weekend.

Figure 2A:
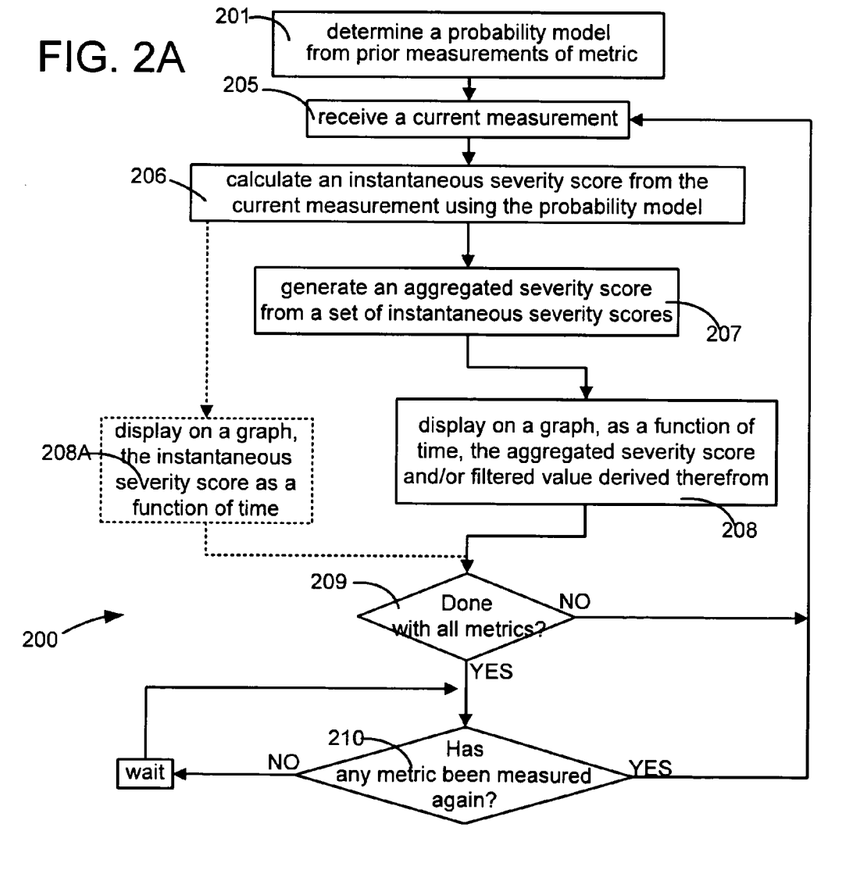
FIGS. 2A and 2B illustrate, in flow charts, acts performed in accordance with the invention.
Figure 2B:
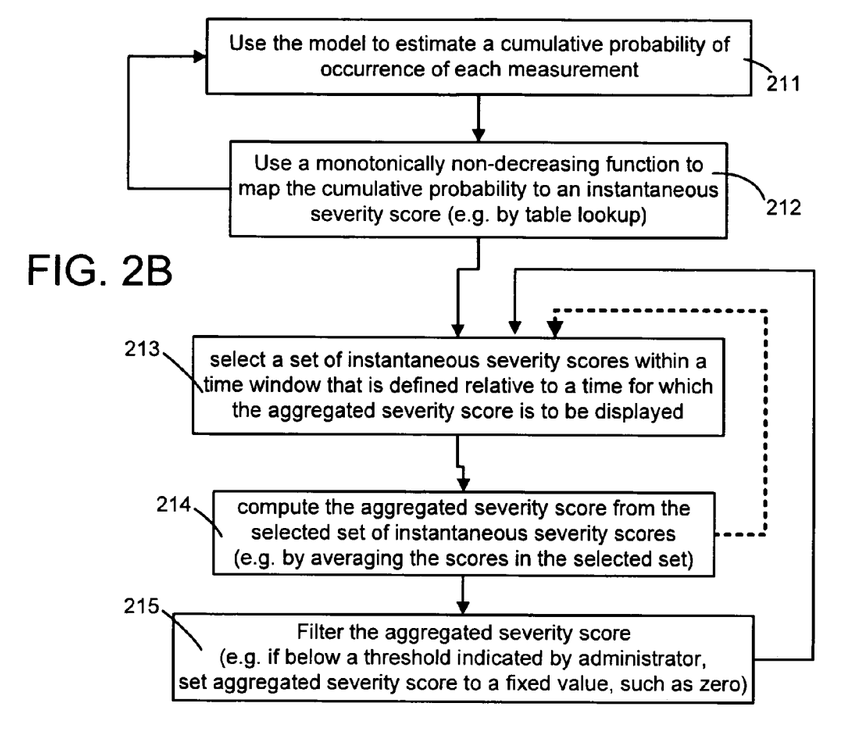
Figure 2C:
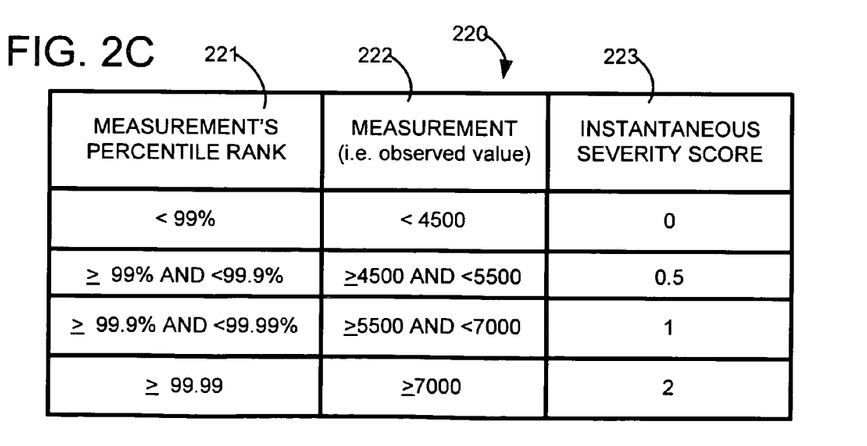
FIG. 2C illustrates a mapping (implemented in a table) that is formed and used in some embodiments, when performing respective acts 201 and 206 shown in FIG. 2A.

The precise manner in which the above-described mapping is formed (for example as a function or table), can differ depending on the embodiment. Several methods for forming such a mapping are described in detail below, for illustrative purposes, other mapping methods are expressly contemplated by the inventors (e.g. based on a Weibull probability model instead of an exponential probability model). In addition, instead of percentile ranks, use of other probability indicators in a mapping of the type shown in FIG. 2C are also expressly contemplated by the inventors. In some embodiments, percentile ranks (also called "percentiles") of the type shown in column 212 in FIG. 2O are determined from extrapolation of an exponential tail whose two parameters are determined from the user-selected baseline of prior measurements as described in the commonly owned, concurrently filed and co-pending U.S. patent application Ser. No. 11/173,525, entitled "AUTOMATIC DETERMINATION OF HIGH SIGNIFICANCE ALERT THRESHOLDS FOR SYSTEM PERFORMANCE METRICS USING AN EXPONENTIALLY TAILED MODEL" filed by John Beresniewicz and Amir Najmi, that is incorporated by reference herein in its entirety.

In the embodiment illustrated in FIG. 2C, four specific numbers namely 0, 0.5, 1 and 2 are preprogrammed into the computer, to represent four discrete values of a severity score that is to be plotted, if a current measurement is within one of the corresponding four percentile ranges: (a) <99%, (b) ≧99% AND <99.9%, (c) ≧99.9% AND <99.99%, (d) ≧99.99%. As noted above, the metric's values 5500 and 7000 and 4500 at the boundaries of the four percentile ranges are identified by use of the probability model, with one such table being created for each set of measurements. For example, if the time partitioning scheme in effect is hour of the day and day of the week, then computer 500 contains 24×7, i.e. 168 such tables.

Note that although four discrete values are shown and described for the severity score, alternative embodiments may use such a severity score having a continuous range of values, and/or values on a different scale (e.g. 0-10 or 0-100). Hence in accordance with the invention, columns 211 and 213 (FIG. 2B) are preprogrammed into computer 500 of this embodiment to represent the probability model (see act 201 in FIG. 2A). An alternative embodiment uses the following three predetermined numbers namely 0, 1 and 2 and the following three percentile ranges: (a) <80%, (b) ≧80% AND <99%, and (c) ≧99%. Note that although certain percentile ranges and corresponding predetermined numbers are described as being used in a programmed computer 500 for illustrative purposes, other percentile ranges and other predetermined numbers may be used in other embodiments.

Although in several embodiments a table is used to identify a percentile range of a current measurement, and thereby the instantaneous severity score associated therewith (e.g. via a lookup of the table in FIG. 2C), some alternative embodiments use a formula for an exponential tail (as described in the above-identified patent application) to determine probability of a current measurement, followed by taking the negative of the base-10 logarithm of a complement of the current measurement's probability, which is expressed as follows:

$$N = -\log_{10}(1-A)$$

wherein A is the current measurement's probability (e.g. as determined from an exponential tail), and N is the instantaneous severity score that is plotted in a graphical display. For example, a measurement that has the probability of 0.01 has its instantaneous severity score computed as $-\log_{10} 0.01 = 2$.

After a mapping is formed (via a table or a formula), between a probability indicator and a metric's value (e.g. after column 212 in table 210 in FIG. 2C is filled in), the computer 500 is programmed as follows. The computer 500 automatically receives as input a time series of measurements of the metric that are captured periodically within a system (such as an email system or a database) being monitored (as per act 205 in FIG. 2A), converts them to instantaneous severity scores e.g. by use of columns 212 and 213 in the table shown in FIG. 2C (as per act 206), generates aggregated severity scores therefrom by aggregating over a moving time window (as per act 207 in FIG. 2A), and displays the aggregated severity scores (or a filtered value obtained therefrom) in a graph as a function of time (as per act 208 in method 200 in FIG. 2A). If measurements of one or more metrics to be displayed on the screen have not yet been displayed, then as per act 209 the computer 500 returns to act 205. If all measurements have been displayed then the computer checks (as per act 210) if any other measurement has been received and if not waits, and if so returns to act 205

Specifically, in act 205 the programmed computer 500 obtains a current measurement of the metric from a source within the monitored system. The current measurement may be obtained either by polling the source at periodic intervals or in response to interrupts from the source. The specific manner in which the measurement is obtained is not a critical aspect of the invention.

Each measurement typically includes (a) a numeric value collected and/or computed at regular time intervals and (b) a timestamp indicating the time at which the measurement is made. Thus a set of such measurements form time series data. The measurements are made asynchronously relative to a method of the type illustrated in FIG. 2A that is performed in some embodiments to use the measurements. Such an input time series received by the computer 500 is expressed as a set of 2-tuples composed of the timestamp and metric's value (as measured) as follows:

$$M=\{(t_1, v_1), (t_2, v_2), \ldots, (t_n, v_n)\}$$

The above definition can be extended to include multivariate time series; that is a vector of metric values sharing a common timestamp having been measured simultaneously. There are a number of sources for such time series in both Oracle's Enterprise Manager Repository and Oracle's 10 g Server, including: (1) V$SYSMETRIC virtual table in Oracle RDBMS 10 g, (2) DBA_HIST_SYSMETRIC_HISTORY table in Oracle RDBMS 10 g R2 and (3) MGMT_METRICS_RAW in EM Repository. In some cases the time series of measurements that are received as input (as per act 205 in FIG. 2A) is actually a time series of statistical aggregates from a raw data time series. Examples of an input time series that are received in some embodiments are (1) DBA_HIST_SYSMETRIC_SUMMARY in RDBMS 10 g, which is a snapshot-level aggregation of V$SYSMETRIC and (2) MGMT_METRICS_1 HOUR in Enterprise Manager Repository, which is an hourly aggregation of MGMT_METRICS_RAW available in in both Oracle's Enterprise Manager Repository and Oracle's 10 g Server,.

Some sources in the system under observation produce each numeric value in the input time series over a time interval and thus with two timestamps (a "begin time" and "end time"). In this case the two timestamps are converted by the programmed computer 500 in act 205 (FIG. 2A) into a single timestamp, using a midpoint between them. NOTE: the use of midpoint timestamps is based on the assumption that interval-based time series from a common data source will have equal-sized intervals. When this is not the case, then weighted computations using interval size as the weighting factor are used to generate the single timestamp.

Next, as per act 206, the computer 500 is programmed to calculate from each measurement, using the probability model. Some embodiments use two parameters of a probability model (e.g. decay factor and location of an exponential tail) to estimate the cumulative probability of the occurrence of each measurement (as per act 211 in FIG. 2B). These two parameters are determined in some embodiments as described in the U.S. patent application by John Beresniewicz and Amir Najmi, that is incorporated by reference above. The cumulative probability is thereafter mapped (as per act 212 in FIG. 2B), via a monotonically non-decreasing function (which may be implemented by a formula or by a table depending on the embodiment), to an instantaneous severity score of the type described herein.

Several embodiments use a probability model in the form of one or more percentiles ranges (e.g. column 222 in FIG. 2C), to directly look up the mapping (e.g. column 223), thereby to generate a instantaneous severity score directly, without explicitly determining the cumulative probability for each measurement that is being received. To summarize, in the embodiment illustrated in FIG. 2C, the computer 500 is programmed to implement act 206 (FIG. 2A) by directly identifying one of the five ranges in which the current measurement falls, followed by identifying a corresponding number for the identified range that is to be used as the instantaneous severity score.

As an example, if the current measurement has the value (as observed) of 6000 then the appropriately programmed computer 500 selects a range (from among the four ranges in table 210 in FIG. 2B) within which this measurement falls to be $\geq 5500$ AND $<7000$. Note that the range boundaries 5500 and 7000 and 4500 are merely exemplary, and these boundaries are different for different metrics. Based on this selected range, the computer 500 identifies an instantaneous severity score (by looking up table 210 in FIG. 2B) as being 1 for the current measurement. The computer 500 is further programmed to plot this severity score of 1 in a graph display (see FIG. 3A), either directly or after aggregating (e.g. by averaging) it over time or both, depending on the embodiment.

In some embodiments, the computer 500 is programmed to display (as per act 208A in FIG. 2A), in a moving graph (that scrolls to the left as time passes), the instantaneous severity score resulting from calculation (in act 206), for each moment in time (i.e. the instantaneous value) when a measurement is made (called "instantaneous display embodiments"). However, several, embodiments display (as per act 208 in FIG. 2A) an aggregated value of severity scores that is obtained by averaging several instantaneous severity scores of measurements that were made over a trailing time window of most recent moments in time on the graph being displayed. For example, one embodiment selects (as per act 213 in FIG. 2B), a set of instantaneous severity scores within such a time window, that is defined by the current moment (on the display) and the last four moments (when measurements were made).

Next, as per act 214, the computer 500 computes the aggregated severity score for the current moment, by applying a formula to five instantaneous severity scores, namely the values obtained (in act 212) for each of the current moment and the most recent four moments. Thereafter, in some embodiments the computer 500 optionally filters out (as per act 215) momentary aberrations in the aggregated severity score that is determined to be too small, e.g. by setting the aggregated severity score to zero if a corresponding measurement at the current moment (in the display) is below an administrator-selected threshold.

Note that the instantaneous severity scores being aggregated are on the same scale which is dimensionless (e.g. have one of the fixed discrete values namely 0, 0.5, 1 and 2), regardless of the moments in time of the corresponding measurements (from which the scores were derived). For example, if all measurements in a baseline are partitioned by the hour of the day and by the day of the week, then a first measurement 391 (FIG. 3C) at 10 AM on Monday that is significantly higher than a second measurement 392 at 11

AM on Monday may both have the same severity score of 1, if both fall within the same range of corresponding percentile ranks 393 and 394 (FIG. 3B) relative to prior measurements in the respective hours (of 10 AM and 11 AM on past Mondays in the administrator-selected "baseline" of measurements). In this example, the column 222 of the table shown in FIG. 2C, has two different sets of ranges, one set has boundaries determined from prior measurements at 10 AM on past Mondays and another set has boundaries determined from prior measurements at 11 AM on past Mondays.

Note that in other embodiments, the number of measurements that are aggregated in this manner can be any number other than five (e.g. eight, four or even two measurements may be aggregated). Note also that in other embodiments, during aggregation, any formula other than a simple average (i.e. summing up and dividing by the number of scores being summed) may be used. Time aggregating embodiments damp down or eliminate from display momentary abnormalities in the instantaneous severity score.

In a first embodiment, if the current measurement results in an instantaneous severity score of 2 (which is the maximum) and if the most recent four instantaneous severity scores were 0 (which is the minimum), then the aggregate significance score is computed by simple averaging (in this first embodiment), to yield 0.4 as the aggregated score, obtained as (2+0+0+0+0)/5. A second embodiment computes the aggregated score by normalized averaging, to yield 0.2, which is obtained as (2+0+0+0+0)/(5*2) because of dividing the average by 2 (which is the maximum score).

Figure 3A:
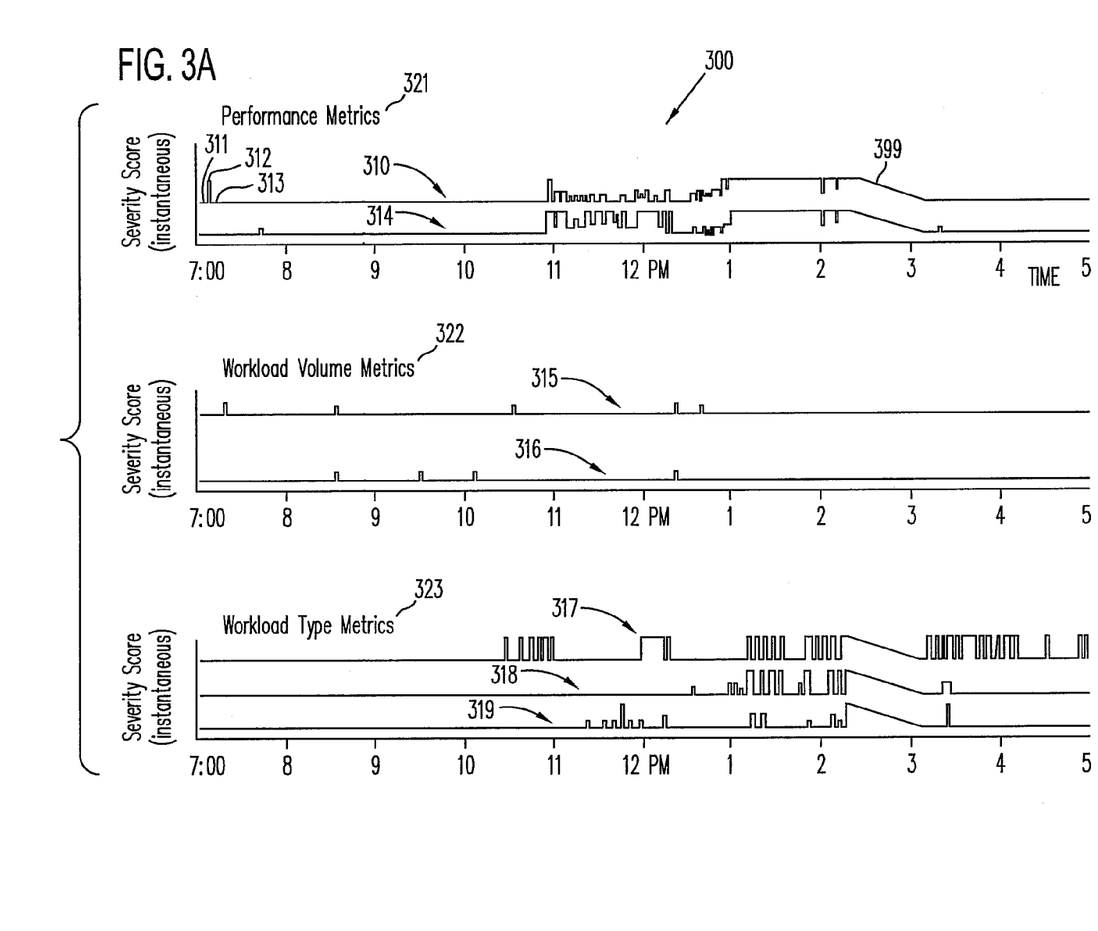
FIG. 3A illustrates a graphical display that is generated in some embodiments on performance of act 207 shown in FIG. 2A, including three categories of metrics, namely (a) performance metrics, (b) workload volume metrics and (c) workload type metrics that are displayed on a single screen of some embodiments.
Figure 3B:
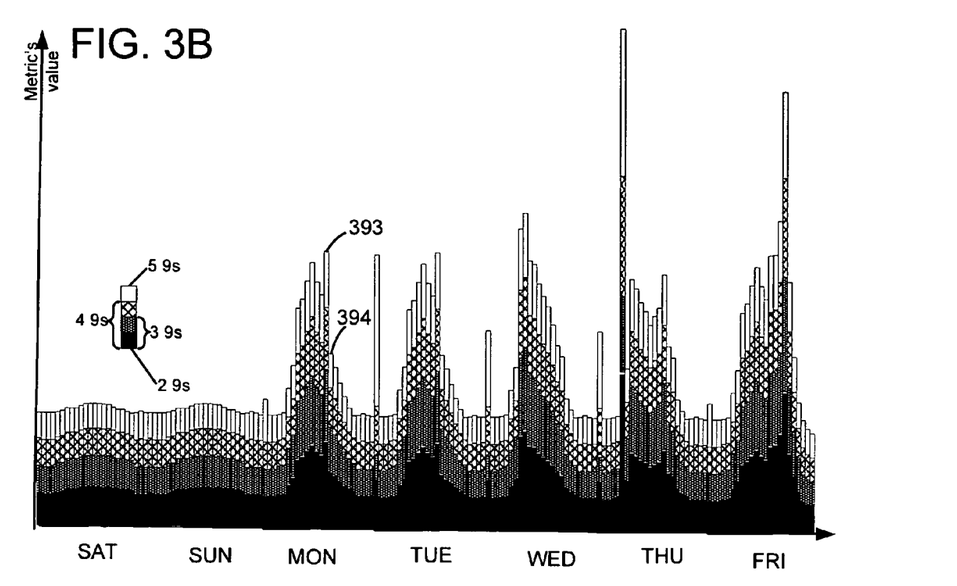
FIG. 3B illustrates, in a graphical display, the ranges of a metric's prior measurements having 2 nines, 3 nines, 4 nines, and 5 nines cumulative probability, plotted as a function of time, for each day of the week.

During an optional filtering step 215 in FIG. 2B, such an aggregated severity score is compared to a predetermined lower limit and set to zero prior to display if less than the lower limit. That is, non-zero aggregated severity scores are visually suppressed in the displayed graph when below the lower limit. This is illustrated in FIG. 3A, wherein at point 311 even though the instantaneous value of the severity score is non-zero (as noted above), the graph shows zero value.

If a series of measurements persists in having high instantaneous severity scores (e.g. if the current measurement as well as the last four measurements have their instantaneous severity scores as the maximum of 2), then the aggregated severity score is non-zero. In the first embodiment the aggregated severity score is also 2. When this value exceeds the predetermined lower limit previously noted in optional filtering step, the aggregated severity score is displayed. Hence, the graphical display shows a non-zero value, as illustrated by point 312 in FIG. 3A. A graph 310 that includes the points 311 and 312 is constructed from an output time series generated by act 207 in FIG. 2A. and displayed by an appropriately programmed computer 500 in accordance with the invention.

Graph 310 of some embodiments is displayed through a time window that moves to the right with passage of time. In FIG. 3A, the current time is 5 PM and the earliest time is 7 AM, so that 10 hours are displayed in this example window. As the current time changes (e.g. when the current time becomes 5:01 PM, the window moves relative to the graph, to show the current time, i.e. to include one or more newest instantaneous severity scores for new moments in time while discarding an equal number of oldest instantaneous severity scores (i.e. graph 310 itself moves left in FIG. 3A as time passes). Note that instead of a moving graph that is used in some embodiments, other embodiments display a moving line of time in a stationary window, as illustrated by line of time 114 in FIG. 1B.

Aggregating of instantaneous severity scores over time introduces a lag (i.e. a delay or latency) in visually informing a human operator about a significant change in the metric. Therefore, even when the instantaneous severity score falls to zero as illustrated by point 313 in FIG. 3A, this point 313 is not displayed if a time averaged value of a set of instantaneous severity scores (e.g. 5 scores) is displayed as discussed above. For example, if the last four instantaneous severity scores were 2, when they are combined with a fifth instantaneous severity score of 0, the aggregate severity of approximately 1.66 (or exactly (2+2+2+2+0)/5). At the next moment if the instantaneous score is zero, the five instantaneous severity scores that are averaged are (2, 2, 2, 0, 0), which yields an average of 1.2.

Latency in the time averaged instantaneous severity score is a disadvantage, if accuracy in displaying a metric's return to normalcy is important. Such a lag is eliminated in some embodiments that display the time-averaged value by default (i.e. under most conditions), and replace the time-averaged value with the instantaneous value at each of a series of moments, wherein the metric's instantaneous value is deemed to have persistently returned to normal. In several embodiments if the instantaneous value of the severity score is at 0 for five (or some other number) consecutive moments (which is the same number of moments over which the time averaged value is calculated), then the averaged value at these five moments is replaced by the corresponding instantaneous value (of zero).

Figure 3C:
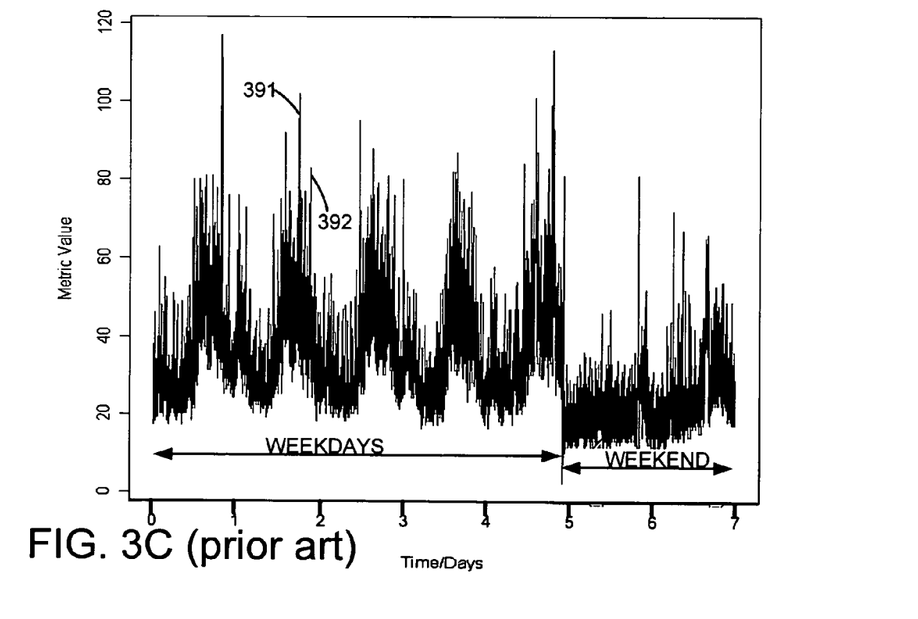
FIG. 3C illustrates, in a graphical display, the metric's raw measurements plotted as a function of time, for each day of the week.
Figure 3D:
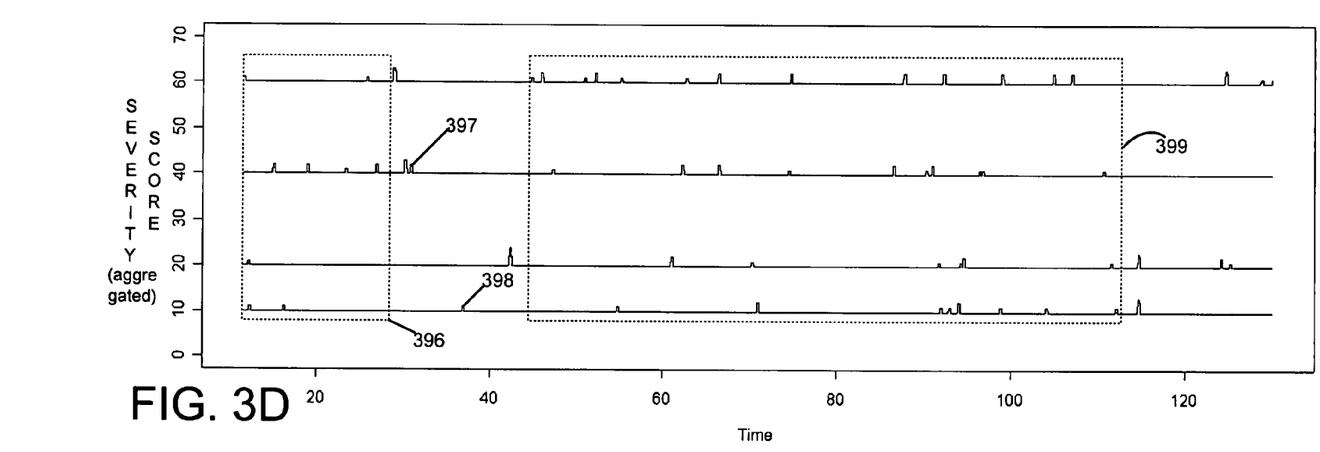
FIGS. 3D and 3E illustrate graphical displays that are generated in some embodiments to display aggregated severity scores (unfiltered version and filtered version respectively).

Note that although replacement of an aggregated severity score by a corresponding instantaneous severity score at the moment being displayed, has been discussed in the previous paragraph for the metric's transition from atypical to typical, as will be apparent to the skilled artisan, a similar replacement is also possible for the metric's transition from typical to atypical. Such replacement on both sides is implemented in some embodiments, resulting in sharper peaks (as compared to displays without such replacement) as illustrated in FIGS. 3C and 3D. The replacement results in technically accurate display, because the rise and fall in the display coincides better and more accurately with the actual times at which the corresponding transitions occurred in the system under observation, while the aggregation emphasizes any events that have more than momentary significance. Hence, the displays in FIGS. 3C and 3D are obtained from combinations of aggregated severity scores and instantaneous severity scores, which combination provides the benefits of both kinds of scores, namely boundaries are accurately shown of an event with temporal significance, while momentary spikes are not shown due to aggregation over time.

In some embodiments, graphs for multiple categories of metrics are displayed on a single screen, at locations that are predetermined relative to one another. For example, FIG. 3A illustrates graphs 310, 314, 315, 316, 317, 318 and 319 of various metrics that have been grouped into one of three categories 321, 322 and 323. The graphs in each category are displayed next to one another. This is illustrated in FIG. 3A by graphs 310 and 314 of a first category 321 (for performance metrics), which are displayed physically adjacent to one another with a small distance therebetween. Similarly, graphs 315 and 316 of a second category 322 are displayed physically adjacent to one another. Finally, graphs 317-319 of a third category 323 are displayed physically adjacent to one another.

In one embodiment, graphs of each category are displayed in different shades of a common color. In an illustrative example, graphs 310 and 314 are displayed in a light shade and a dark shade of blue respectively, while graphs 315 and 316 are displayed in a light shade and dark shade of brown respectively, and graphs 317-319 are displayed in three shades of green respectively. Note that the just-described colors and shades are not in fact shown in the attached FIG. 3A, but their usage will be apparent to the skilled artisan in view of this description.

Note that the graphs 310 and 314-319 in FIG. 3A are aligned vertically relative to one another to share a common horizontal axis along which time is displayed (in units of hours of the day). Although the common horizontal axis is shown multiple times, once for each category in this illustrative embodiment, other embodiments may show this axis only once in the entire graphical display 300.

Note that the three categories 321, 322 and 323 are deliberately selected to enable a human operator to identify a causal relationship as follows. Specifically, category 321 contains graphs of metrics that indicate performance of the system that is being observed. Categories 322 and 323 are selected to contain graphs of metrics that are indicative of a cause for a bump (i.e. a peak) in a graph in category 321. A bump in a graph in category 321 indicates performance degradation in the observed system, which may be explained by, for example, an increase in workload volume shown as category 322 or an increase in workload type shown as category 323.

A human operator, on viewing the single screen display 300, is enabled to form a visual correlation between changes in category 321 with changes in one (or both) of categories 322 and 323, simply by looking vertically up and down a line through a given point in time. These correlations obtained from FIG. 3A are more valuable than correlations of raw measurements in that the dimensionless units of the severity score have common semantics across the metrics. Therefore, such correlations can be used to identify the causes of events being shown in the display, thereby to assist the administrator in making changes to the observed system, as needed (e.g. adding more physical memory and/or increasing the size of a paging file). In the example illustrated in FIG. 3A, a change in the graph 310 in region 399 which indicates a performance event starting at about 2:15 PM is visually correlated by a human administrator on looking vertically downwards and finding a similar change in the graphs 317-319 at about the same time (i.e. 2:15 PM).

Note that the region 399 in FIG. 3A a system shutdown event, with instantaneous severity values unavailable during the down time from 2:15 PM to 3 PM. A graphing program employed in this embodiment renders a continuous line, although in alternative embodiments the line is discontinuous over the down time (stopping at 2:15 PM and starting at 3 PM). In still other alternative embodiments an icon or other symbol is displayed in region 399 to represent the down time.

Hence the display of graphs in FIG. 3A enables the human administrator to quickly reason that a performance degradation illustrated in category 321 at 12:15 PM is caused by a change in category 323, i.e. due to a change in workload type, noting that there is no change in category 322. Such a change can be explained if execution of a batch job is started by a database administrator, during a time of the day when on line transaction processing (OLTP) is normally performed.

Figure 4:
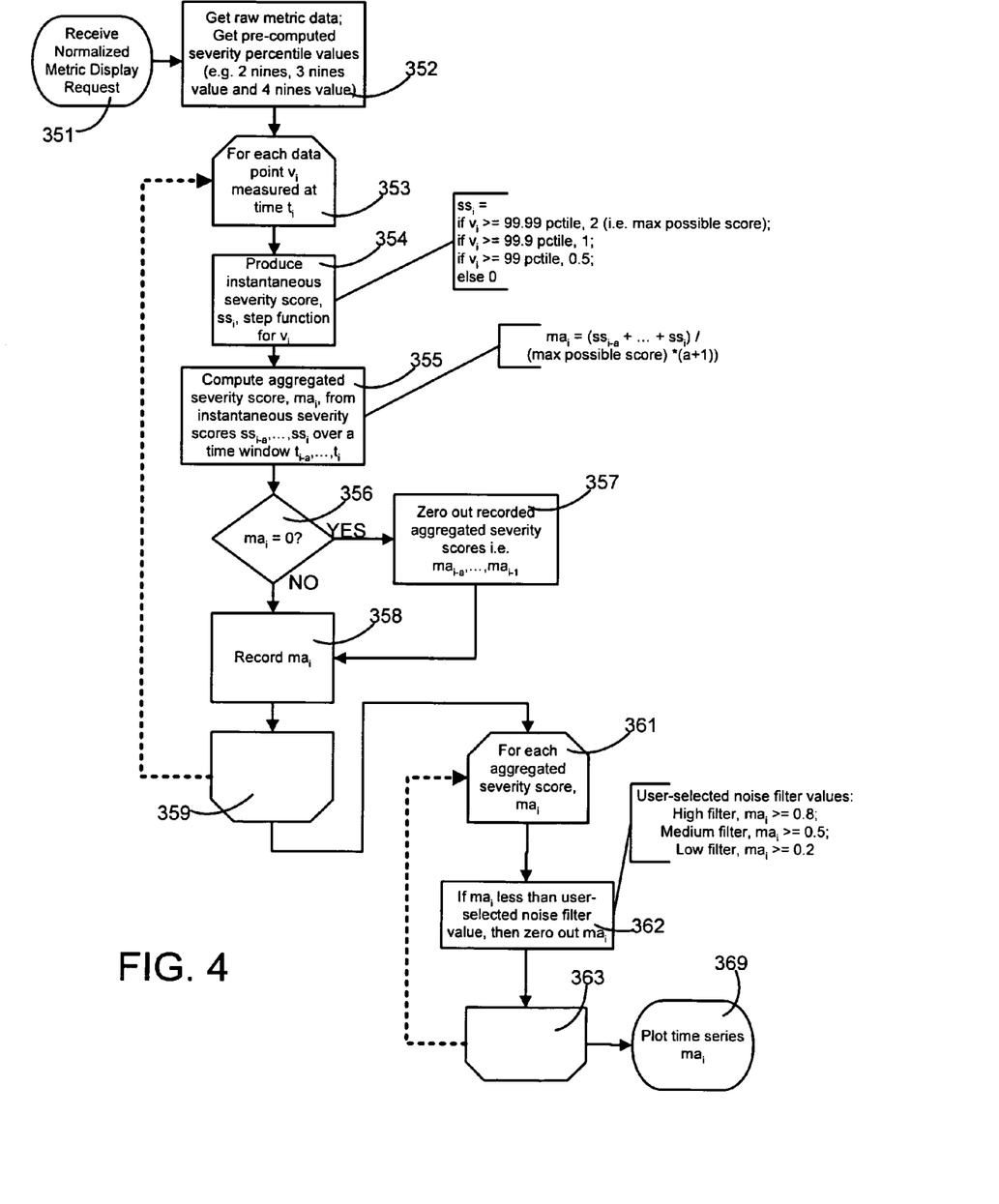
FIG. 4 illustrates, in a flow chart, acts performed in some embodiments of the invention.

FIG. 4 illustrates a method that is implemented in some embodiments of the invention as discussed next. Specifically, in act 351, the programmed computer 500 receives a request to display normalized metrics, and proceeds to act 352. In act 352, the computer obtains raw metric data (i.e. measurements), and also obtains a list of predetermined cumulative probabilities, such as 90%, 99%, 99.9% and 99.99%.

Next, the computer 500 repeatedly performs acts 353-359 in a "for" loop as follows. In act 353 the computer sets up the loop variables, for each data point (i.e. measurement) $v_i$, measured at time $t_i$. Then, in act 354, the computer produces a severity score $ss_i$ using a step function based on the value $v_i$ as follows: $ss_i=2$ if $v_i>=99.99$ percentile, 1 if $v_i>=99.9$ percentile, 0.5 if $v_i>=99$ percentile, else 0. Next, in act 355, the computer generates an aggregated severity score $ma_i$, from the severity scores $ss_{i-4}, \ldots, ss_i$.

Next, in act 356, the computer 500 checks if the aggregated severity score that has just been computed is zero, i.e. if $ma_i$ is zero. If yes, then the computer goes to act 357 and deliberately zeros out the last four aggregate severity scores, namely $ma_{i-4}, \ldots, ma_{i-1}$ which act as noted above ensures that the time at which the aggregated severity score first returns to zero is accurately portrayed. From act 356 (on the "yes" branch) and act 357, the computer 500 goes to act 358 and records the aggregated severity score for the time window defined by the current moment, i.e. $ma_i$ so that it is plotted in the graphical display. Note that act 358 is also entered on the "no" branch from act 356. Thereafter, the computer 500 checks in act 359 if the conditions to exit the loop are met and if not returns to act 353 to increment loop count i.

While some embodiments may display the results $ma_i$ of completion of the above-described for loop, in the illustrative embodiment in FIG. 4 the computer 500 is further programmed to perform a filtering function (as per act 215 in FIG. 2B) as illustrated by acts 361-363 discussed next. Specifically, in act 361, the computer sets up loop variables, for each moving average result $ma_i$. Next, the computer goes to act 362 and reduces the value of result $ma_i$ in accordance with one of the three filters, which is identified as selection to the programmed computer 500 by a human operator, through a graphical user interface. For example, in case a High filter is selected the computer ensures that $ma_i>=0.8$ (i.e. lower values $ma_i$ are zeroed). Similarly, if a Medium filter is selected, $ma_i>=0.5$ and in case a Low filter is selected, $ma_i>=0.2$.

Figure 3E:
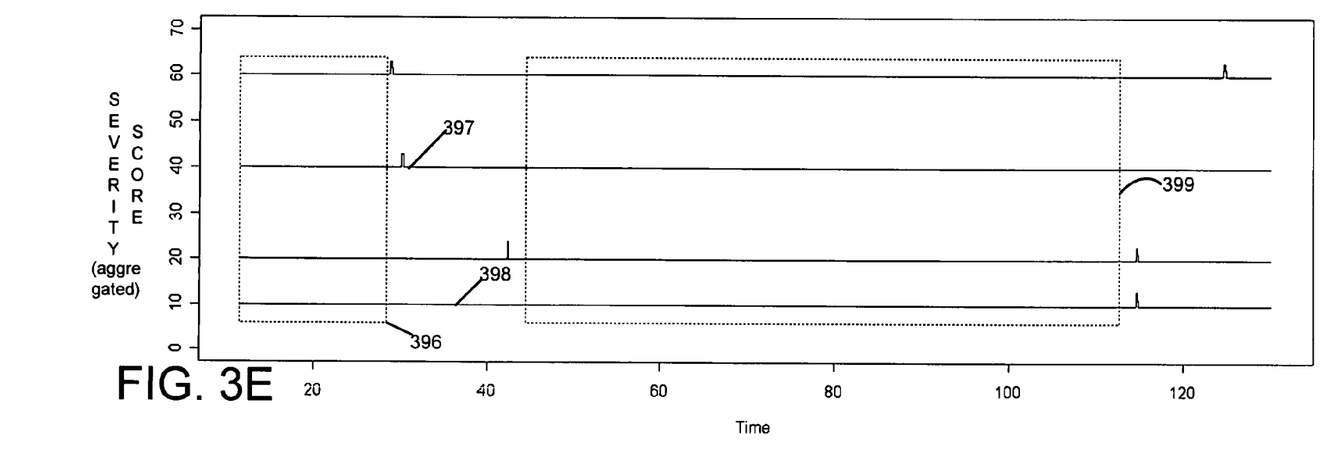

Such filtering is illustrated in FIGS. 3D and 3E, wherein peaks in regions 396-399 present in FIG. 3D have been eliminated from FIG. 3E for being below the predetermined lower limit of the filter, thereby to provide a cleaner display of more significant events. Note further that such filtering also sharpens (or thins) the six peaks that remain in FIG. 3E because the aggregated value at each transition is visually suppressed in the display, until the aggregated value rises above the predetermined lower limit of the filter.

Method 200 (FIG. 2A) is used to program a computer 500 of the type illustrated in FIG. 5A which is discussed next. Specifically, computer 500 includes a bus 502 (FIG. 5A) or other communication mechanism for communicating information, and a processor 505 coupled with bus 502 for processing information. Computer 500 also includes a main memory 506, such as a random access memory (RAM) or other dynamic storage device, coupled to bus 502 for storing information and instructions to be executed by processor 505.

Main memory 506 also may be used for storing temporary variables or other intermediate information during execution of instructions to be executed by processor 505. Computer 500 further includes a read only memory (ROM) 508 or other static storage device coupled to bus 502 for storing static information and instructions for processor 505. A storage device 510, such as a magnetic disk or optical disk, is provided and coupled to bus 502 for storing information and instructions.

Computer 500 may be coupled via bus 502 to a display 512, such as a cathode ray tube (CRT), for displaying information to a computer user. An input device 514, including alphanumeric and other keys, is coupled to bus 502 for communicating information and command selections to processor 505. Another type of user input device is cursor control 516, such as a mouse, a trackball, or cursor direction keys for communicating direction information and command selections to processor 505 and for controlling cursor movement on display 512. This input device typically has two degrees of freedom in two axes, a first axis (e.g., x) and a second axis (e.g., y), that allows the device to specify positions in a plane.

As described elsewhere herein, probabilistic conversion is performed by computer 500 in response to processor 505 executing one or more sequences of one or more instructions contained in main memory 506. Such instructions may be read into main memory 506 from another computer-readable medium, such as storage device 510. Execution of the sequences of instructions contained in main memory 506 causes processor 505 to perform the process steps described herein and illustrated in FIG. 3. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave (such as an electromagnetic wave) as described hereinafter, or any medium from which a computer can read.

Various forms of computer readable media may be involved in carrying one or more sequences of one or more instructions to processor 505 for execution. For example, the instructions may initially be carried on a magnetic disk of a remote computer. The remote computer can load the instructions into its dynamic memory and send the instructions over a telephone line using a modem. A modem local to computer 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 505 retrieves and executes the instructions. The instructions received by main memory 506 may optionally be stored on storage device 510 either before or after execution by processor 505.

Computer 500 also includes a communication interface 515 coupled to bus 502. Communication interface 515 provides a two-way data communication coupling to a network link 520 that is connected to a local network 522. Local network 522 may interconnect multiple computers (as described above). For example, communication interface 515 may be an integrated services digital network (ISDN) card or a modem to provide a data communication connection to a corresponding type of telephone line. As another example, communication interface 515 may be a local area network (LAN) card to provide a data communication connection to a compatible LAN. Wireless links may also be implemented. In any such implementation, communication interface 515 sends and receives electrical, electromagnetic or optical signals that carry digital data streams representing various types of information.

Network link 520 (not shown in FIG. 5A) typically provides data communication through one or more networks to other data devices. For example, network link 520 (not shown in FIG. 5A) may provide a connection through local network 522 to a host computer 525 or to data equipment operated by an Internet Service Provider (ISP) 526. ISP 526 in turn provides data communication services through the world wide packet data communication network 528 (not shown in FIG. 5A) now commonly referred to as the "Internet". Local network 522 and network 528 (not shown in FIG. 5A) both use electrical, electromagnetic or optical signals that carry digital data streams. The signals through the various networks and the signals on network link 520 (not shown in FIG. 5A) and through communication interface 515 (not shown in FIG. 5A), which carry the digital data to and from computer system 500, are exemplary forms of carrier waves transporting the information.

Computer system 500 can send messages and receive data, including program code, through the network(s), network link 520 and communication interface 515. In the Internet example, a server 550 might transmit a mission (which is part of a transportation plan) through Internet 528 (not shown in FIG. 5A), ISP 526, local network 522 and communication interface 515.

The instructions for performing method 200 (FIG. 2A) may be executed by processor 505 as they are received, and/or stored in storage device 510, or other non-volatile storage for later execution. In this manner, computer 500 may obtain the just-described instructions and any related data in the form of a carrier wave.

Figure 5A:
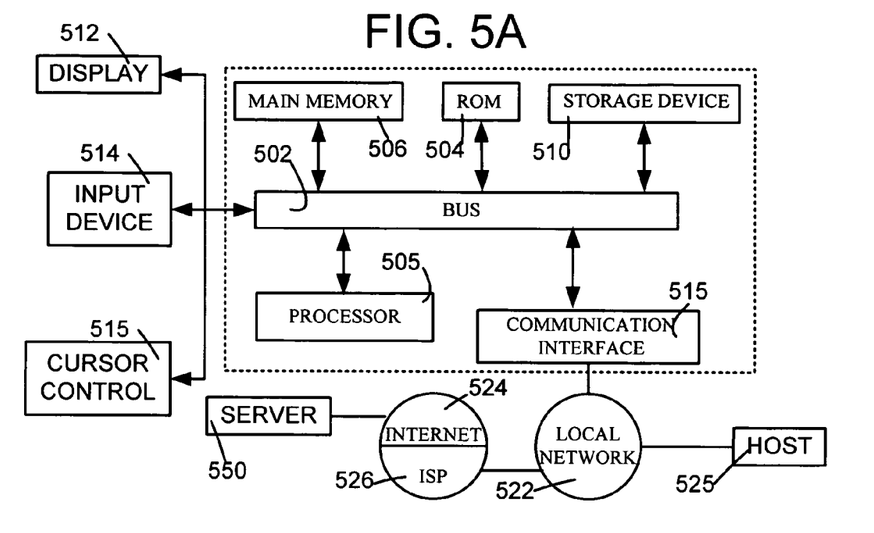
FIGS. 5A and 5B illustrate, in block diagrams, hardware and software portions of a computer that performs the method illustrated in FIGS. 2A and 2B.
Figure 5B:
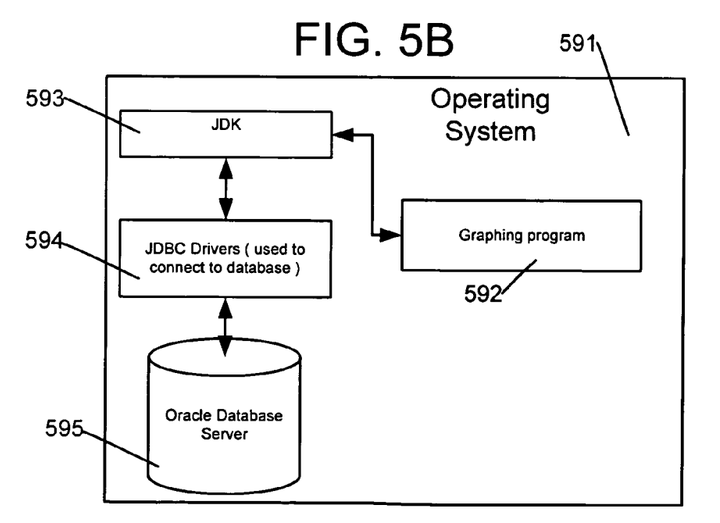

Note that FIG. 5A is a very low-level representation of many hardware components of a computer system. Several embodiments have one or more additional software components in main memory 506 as shown in FIG. 5B: Operating System 591 (e.g. Microsoft WINDOWS 2000), Database Server 595 (e.g. Oracle Server v9i2 for the source computer; e.g. Oracle Server v8i for the target computer), Java Development Kit 593 (e.g. JDK v118), graphing program 592, and JDBC drivers 594 (e.g. JDBC driver available from Oracle Corporation).

Numerous modifications and adaptations of the embodiments described herein will become apparent to the skilled artisan in view of this disclosure.

Numerous modifications and adaptations of the embodiments described herein are encompassed by the scope of the invention.

What is claimed is:

1. A computer implemented method of displaying an output time series of aggregated severity scores derived from an input time series of measurements of an attribute of a system, the computer implemented method comprising:

receiving said input time series of measurements from a source in the system;

wherein the system comprises at least one computer;

calculating an instantaneous severity score for each measurement in the input time series, using a probability model that has been determined from a plurality of prior measurements of said attribute of said system;

generating aggregated severity scores in the output time series from a corresponding plurality of sets of said instantaneous severity scores; and displaying at least several aggregated severity scores in the output time series.

2. The method of claim 1 wherein each set of instantaneous severity scores, used in generating an aggregated severity score, is derived from measurements in a fixed-width time window having a fixed offset relative to a time associated with the aggregated severity score in said displaying.

3. The method of claim 1 further comprising:

replacing in said output time series, at least one aggregated severity score with a fixed value if said at least one aggregated severity score satisfies a predetermined condition; and in addition to said displaying, displaying said fixed value at a time associated with said at least one aggregated severity score.

4. The method of claim 1 wherein:

said generating comprises averaging.

5. A carrier wave encoded with instructions to perform the acts of claim 1.

6. A computer readable storage medium encoded with instructions to perform the acts of claim 1.

7. A computer implemented method of displaying an output time series of aggregated severity scores derived from an input time series of measurements of an attribute of a system, the computer implemented method comprising:

receiving said input time series of measurements from a source in the system;

calculating an instantaneous severity score for each measurement in the input time series, using a probability model that has been determined from a plurality of prior measurements;

generating aggregated severity scores in the output time series from a corresponding plurality of sets of said instantaneous severity scores; and displaying at least several aggregated severity scores in the output time series;

wherein said calculating comprises determining a decay factor and a location of an exponential tail of a probability density function of said plurality of prior measurements.

8. The method of 7 wherein said calculating further comprises:

identifying a plurality of values of the attribute corresponding to a plurality of percentiles; and determining the instantaneous severity score for a measurement based on a pair of said values between which said measurement occurs.

9. The method of 7 wherein said using further comprises:

identifying at least one value of the attribute corresponding to a predetermined percentile; and determining the instantaneous severity score for a measurement based on comparison with said at least one value.

10. A computer implemented method of displaying an output time series of aggregated severity scores derived from an input time series of measurements of an attribute of a system, the computer implemented method comprising:

receiving said input time series of measurements from a source in the system;

wherein the system comprises at least one computer;

calculating an instantaneous severity score for each measurement in the input time series, using a probability model that has been determined from a plurality of prior measurements;

generating aggregated severity scores in the output time series from a corresponding plurality of sets of said instantaneous severity scores; and displaying at least several aggregated severity scorns in the output time series;

wherein each set comprises at least one instantaneous severity score in common with another set.

11. The method of claim 1 wherein:

said displaying comprises showing a first graph displayed in a first portion of a screen of a computer;

the method further comprises performing each of said receiving, calculating, generating and displaying for another attribute of said system to display a second graph on said screen; and the first graph and the second graph are shown on said screen adjacent to one another and aligned relative to one another to share a common axis along which time is displayed.

12. A computer comprising a processor and a memory coupled to the processor, the memory being encoded with instructions, wherein said instructions are at least to:

receive said input time series of measurements from a source in the system;

calculate an instantaneous severity score for each measurement in the input time series, using a probability model determined from a plurality of prior measurements;

generate aggregated severity scores in the output time series from a corresponding plurality of sets of said instantaneous severity scores; and display at least several aggregated severity scores in the output time series.

13. A computer for displaying an output time series of aggregated severity scores derived from an input time series of measurements of an attribute of a system, the computer comprising:

means for receiving said input time series of measurements from a source in the system;

wherein the system comprises at least one computer;

means for calculating an instantaneous severity score for each measurement in the input time series, using a probability model determined from a plurality of prior measurements of said attribute of said system;

means for generating aggregated severity scores in the output time series from a corresponding plurality of sets of said instantaneous severity scores; and means for displaying at least several aggregated severity scores in the output time series.

* * * * *

UNITED STATES PATENT AND TRADEMARK OFFICE
CERTIFICATE OF CORRECTION

PATENT NO. : 7,246,043 B2  Page 1 of 1
APPLICATION NO. : 11/173524
DATED : July 17, 2007
INVENTOR(S) : John M. Beresniewicz et al.

It is certified that error appears in the above-identified patent and that said Letters Patent is hereby corrected as shown below:

Title Page, item (56) References Cited

Please insert the following U.S. PATENT DOCUMENTS:

| | | | |
|---|---|---|---|
| 6,675,128 | 01/2004 | Hollerstein | 702/182 |
| 2006/0243055 | 11/2006 | Sundermeyer et al. | 073/760 |

Claim 10, Column 14

Line 15, "scorns" should be changed to --scores--.

Signed and Sealed this

Twenty-sixth Day of February, 2008

JON W. DUDAS
*Director of the United States Patent and Trademark Office*